United States Patent [19]

Schäfer

[11] Patent Number: 4,755,027

[45] Date of Patent: Jul. 5, 1988

[54] METHOD AND DEVICE FOR POLARIZING LIGHT RADIATION

[75] Inventor: Fritz P. Schäfer, Göttingen-Nikolausberg, Fed. Rep. of Germany

[73] Assignee: Max-Planck-Gesellschaft zur Forderung der Wissenschaften e.v., Göttingen, Fed. Rep. of Germany

[21] Appl. No.: 880,310

[22] Filed: Jun. 30, 1986

[30] Foreign Application Priority Data

Jul. 2, 1985 [DE] Fed. Rep. of Germany ....... 3523641

[51] Int. Cl.⁴ .......................... G02B 5/30; G02B 27/28
[52] U.S. Cl. ..................................... 350/394; 350/170
[58] Field of Search ........................ 350/170, 394–395, 350/421, 432; 372/19, 27, 106; 219/121 LG, 121 LN

[56] References Cited

U.S. PATENT DOCUMENTS

| | | | |
|---|---|---|---|
| 2,759,393 | 8/1956 | McLeod | 350/432 |
| 3,283,262 | 11/1966 | Marcatili | 372/19 |
| 3,310,358 | 3/1967 | Marcatili | 350/432 |
| 3,660,779 | 5/1972 | Cuff et al. | 372/27 |
| 4,630,274 | 12/1986 | Schafer | 372/9 |
| 4,636,611 | 1/1987 | Penney | 350/170 |
| 4,642,439 | 2/1987 | Miller et al. | 219/121 LG |

OTHER PUBLICATIONS

Azzam, R. M. A., "Division-of-Wave-Front Polarizing Beam Splitter & Half-Shade Device using Dielectric Thin Film on Dielectric Substrate", App. Optics, 5-1984, pp. 1296-1298.

Lavoie, L., "Conical Axicons used as Optical Polar Everters", App. Optics, 7-1975, pp. 1482-1484.

Rioux et al. "Linear Annular & Radial Focusing with Axicons & Applications to Laser Machining", App. Optics, 5-1978, pp. 1532-1536.

Fink, D., "Polarization Effects of Axicons", App. Optics, 3-1979, pp. 581-582.

Primary Examiner—William H. Punter
Attorney, Agent, or Firm—Kinzer, Plyer, Dorn, McEachran & Jambor

[57] ABSTRACT

A radial or tangential polarization of a beam of light radiation with respect to an optical axis, along which said beam propagates, is effected by causing interaction of the beam with at least one conical interface between a pair of optical media having different indices of refraction. The conical interface(s) may be provided with a polarization-selective coating.

9 Claims, 3 Drawing Sheets

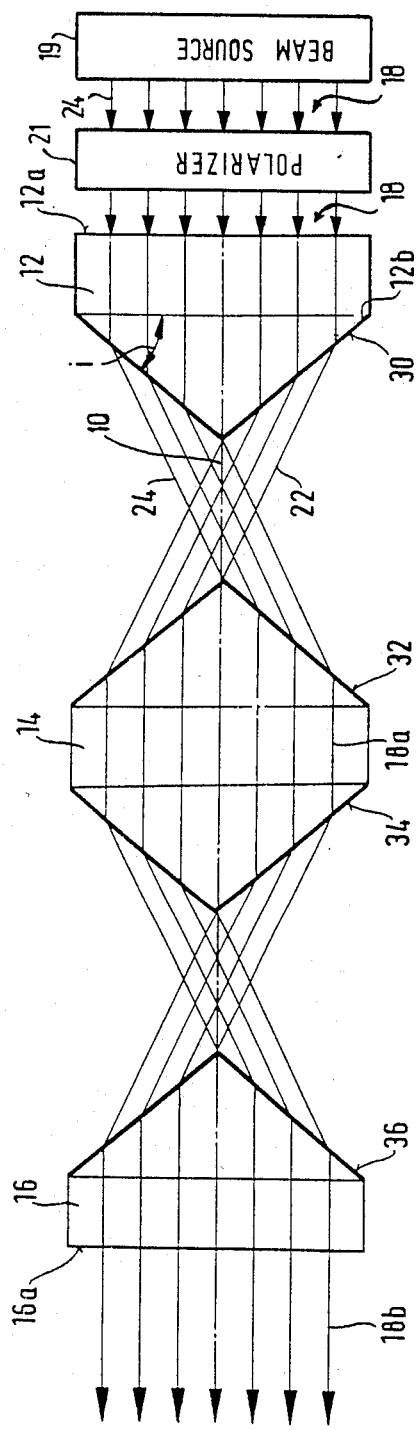
Fig.1
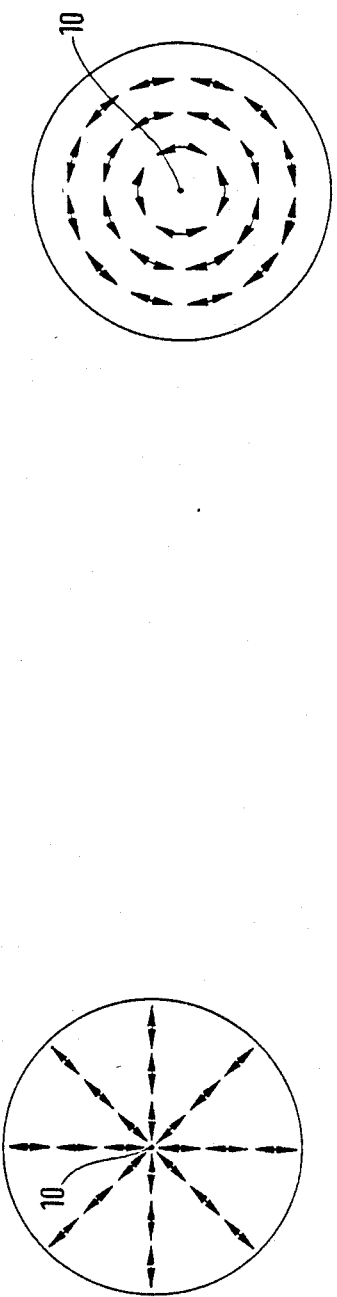
Fig.2
Fig.3

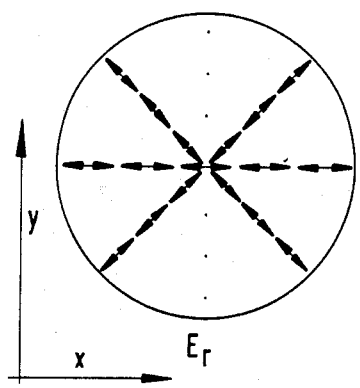
Fig. 4
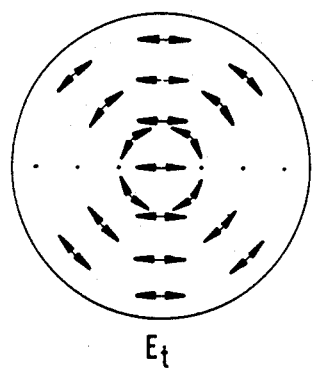
Fig. 5
Fig. 8
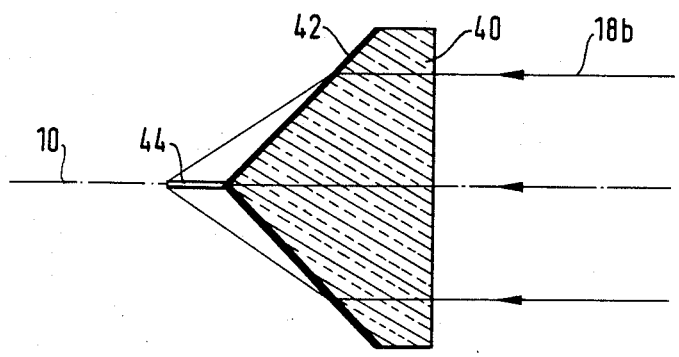

$E_r$ $E_t$ $E_r$ $E_t$ $E_r$ $E_t$

METHOD AND DEVICE FOR POLARIZING LIGHT RADIATION

The present invention relates to methods and devices for polarizing light, more specifically for producing a light beam which is polarized in a radial or tangential (azimuthal) direction with respect to an axis extending in the direction of propagation of the light beam.

BACKGROUND OF THE INVENTION

It is well known in the art that natural light is generally unpolarized and that various polarized states of a light wave exist, such as the general case of the elliptical polarization with its extreme states plane (linear) polarization and circular polarization. Further, various polarizing devices are known with which natural light can be transformed into totally or partially polarized light.

A plane polarized light wave, the electrical vector E of which oscillates parallel to an x direction of a Cartesian coordinate system and which propagates along the z axis, can be described by the following equations $$E_x = E_{0x} \sin(\omega t - kz) \text{ and } E_y = 0$$

wherein
 $E_x$ and $E_y$ are the components of the electrical vector in x and y directions, respectively,
 $E_{0x}$ is the amplitude of the light wave,
 $\omega = 2\pi\nu$ is the angular frequency of the light wave,
 $\nu$ is the frequency of the light,
 $K = 2\pi/\lambda$
 $\lambda$ is the wavelength of the light wave within the medium through which the light wave propagates.
Right-hand (clock-wise) circularly polarized light can be described by the following equations $$E_x = E_{0x} \cdot \sin(\omega t - kz)$$

$$E_y = E_{0y} \cdot \cos(\omega t - kz)$$

wherein
 $E_{0x} = E_{0y} = A$.
 A is the amplitude.
The above equations show that the polarization of a light wave is independent of x and y, i.e. that the electrical vector E has in each point of an xy plane, z=Constant, the same direction.

It is desirable for investigations of the interaction of light with matter, in which a cylindrical type of symmetry prevails because of the conditions of the experiment, to have a "cylinder-symmetrical" distribution of the direction of the electrical vectors of the light wave across the cross-section of the light beam or, in other words, such a distribution that the electrical vector has, at any point of a beam cross-section, either a radial or a tangential (azimuthal) direction with respect to an axis which is assumed to coincide with the z axis. For instance, such a distribution would facilitate the interpretation of experiments for investigating the interaction of laser light with a cylindrical plasma, and further may yield new effects which are totally different from those which are obtained by using plane, elliptically or circularly polarized or unpolarized light, because the magnetic field distribution of the light wave is quite different when the light is radially or tangentially polarized.

SUMMARY OF THE INVENTION

It is an object of the present invention to provide a methods and devices for producing a light beam which is partially or totally radially or tangentially polarized. According to an embodiment of the invention, the desired radial or tangential component of polarization of the light beam is produced by interaction (reflection, transmission) at least one conical surface or interface between a pair of optical media (as glass or quartz and air) having different indices of refraction. In a preferred embodiment, each conical surface is provided with a polarization selective coating, and the device comprises an even number of opposed conical surfaces in the optical path of the beam.

BRIEF DESCRIPTION OF THE DRAWINGS

Preferred embodiments of the invention will now be described with reference to the drawings, in which FIG. 1 is an axial section of a preferred device for producing a cylinder-symmetrically polarized light beam;

FIG. 2 is a schematic depiction of the distribution of the directions of oscillation and the amplitudes of the electrical vector E in an output beam of the device according to FIG. 1 for the case of radial polarization of the output beam and an unpolarized input light beam;

FIG. 3 is a schematic depiction corresponding to FIG. 2, but for tangential polarization of the output beam;

FIGS. 4 and 5 are depictions corresponding to FIG. 2 and FIG. 3, respectively, for an input beam which is plane polarized in the x direction;

FIG. 8 is a schematic depiction of a preferred application of the invention.

Figure 6A:
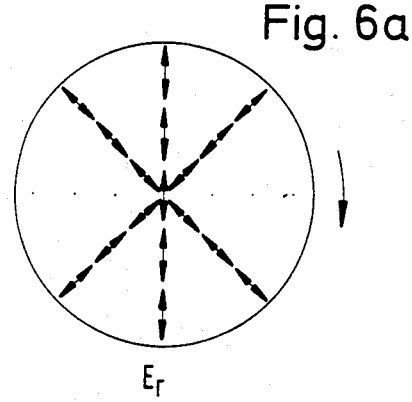
FIGS. 6a to 6c and FIGS. 7a to 7c are depictions corresponding to FIG. 2 and FIG. 3, respectively, for a right-hand circularly polarized input beam.

The principle of the invention is most easily explained with reference to the polarizing apparatus shown in FIG. 1. The device of FIG. 1 comprises three rotational-symmetrical bodies with conical surfaces also known as "Axicons", which are positioned coaxially in spaced relationship along an optical axis 10, more specifically a first or entrance cone 12, a middle or double cone 14 and a third or exit cone 16. The three rotational-symmetrical bodies 12, 14, 16, are made of a material transparent for the light wave and have an index of refraction n. The angle between the normal to the optical axis 10 and a generatrix of each cone surface has the same value i for all of the three bodies. The cylindrical portions of the bodies 12 and 16 adjacent to the conical surfaces are not essential for the function of the device, they merely serve for facilitating the mounting during manufacture and use. The axes of all of the bodies are adjusted to coincide with the optical axis 10.

It is now assumed, as shown in FIG. 1, that a parallel input light beam 18 from a beam source 19 impinges from the right side perpendicularly on a planar front face 12a of the entrance cone 12 and into said cone. Beam 18, which may be of uniform intensity across face 12a or may comprise a hollow beam generated by source 19, in some instances may also be passed through a preliminary polarizer 21. The beam will then emerge through the conical surface 12b where each ray, as shown, is refracted towards the axis 10 according to the Law of Snell. If, as shown, the entrance-side apex of the double cone 14 is positioned at such a distance from the exit-side apex of the entrance cone 12 that the peripheral or marginal rays 22, 24, which emerge from the entrance cone 12, just impinge on the opposed apex of the double cone 14, a parallel ray beam 18a is again produced within the double cone. However, it is immediately obvious that this parallel ray beam 18a has an intensity distribution totally different from that of the beam 18 which enters the entrance cone 12: If it is assumed that the input beam 18 has a constant intensity $I_0$ across its cross-section, then the light flux P through an annular surface having an inner radius r and a radial width dr is given by $P(r) = I_0 \, 2\pi r \, dr$. A comparison of annular cross-sectional surfaces with a small radius $r_1$ and a large radius $r_2$ makes it obvious that the light fluxes through these annuli are proportional to their radii. However, the flux entering into the double cone 14 is compressed from a larger annular area into a smaller annular area while the flux from the smaller annular area is "thinned" into a larger annular area, as FIG. 1 shows.

Because of the symmetrical configuration of the device, similar conditions prevail at the exit of the double cone 14 and the entrance into the exit cone 16 as at the exit from the entrance cone 12 and the entrance into the double cone 14. Thus, a second inversion of the intensity distribution occurs which compensates the first for reason of symmetry so that a constant intensity across the cross-section is again obtained within the exit cone 16, which, of course, also holds true for the beam which emerges from a planar exit face 16a of the exit cone. Thus, if the described apparatus is positioned in a telecentrical beam path of a telescope or similar optical instrument, and if the higher reflection losses by the greater number of interfaces is neglected, the effect on the image is the same as if a plate with parallel surfaces were present.

It is, however, the polarization-selective reflection losses and transmission factors at the conical optical interfaces of the device which are responsible for the exceptional polarization properties of the present device.

It is assumed, for the following explanation of the polarizing properties of the device of FIG. 1, that the conical bodies 12, 14, and 16 are made of quartz-glass (fused quartz) having an index of refraction $n = 1.48$ and that the base angles i of the convex conical surfaces are each equal to the Brewster angle of a quartz-air interface, i.e. about 34°. A ray which falls on a conical interface between a quartz body and the surrounding air is polarization-selectively reflected as well as refracted and transmitted according to the well-known Fresnel equations. The component of the electrical vector which oscillates parallel to the plane of incidence, the so-called p-polarized component, is polarized in the direction of a radius relative to the optical axis 10 because of the conical configuration of the interface, and will therefore be called "r-polarized" in the following. In a similar way, the component polarized normal to the plane of incidence is always a tangentially or azimuthally polarized component, and will therefore be called "t-polarized". Since the cone angle of 34° is the Brewster angle of a quartz-air interface, an r-polarized beam is fully transmitted without reflection losses while 14% of t-polarized light with an angle of incidence of 34° is reflected at each conical surface, so that the degree of transmission T for a conical surface is 0.86. Since the device of FIG. 1 comprises four conical interfaces, the total degree of transmission of the device $T_{ges} = 0.86^4 = 0.55$. If several devices of this type are used in tandem, an output beam with any desired high content of the r-polarized component can be obtained. Thus, the output beam 18b has a polarization with a radial distribution of the electrical vectors across its cross-section, as shown in FIG. 2.

In much more economical and, thus, preferred embodiments of the device according to the present invention, each conical surface is provided with a polarity-selective multi-layer dielectric coating for increasing the coefficient of reflection of the one component of polarization and reducing the reflection of the other component of polarization. Such dielectric multi-layer coatings (which are effective within a limited spectral range), are known, see e.g. Applied Optics, Vol. 23, No. 9, May 1, 1984, pp. 1296 to 1298, and are used e.g. in commercial polarizing laser beam splitters. A transmission of more than 99% for the selected component of polarization and simultaneously of less than 10% for the non-selected component of polarization can easily be obtained with a device provided with these multi-layer coatings.

Thus, if each of the four conical surfaces of the device of FIG. 1 is provided with such a polarization-selective dielectric multi-layer coating 30, 32, 34, 36, respectively, the device will have a degree of transmission of more than 96% for the one, the selected component of polarization, and a degree of transmission of less than $10^{-4}$ for the other, the non-selected component. Thus, a polarization device is provided, by which an input beam 18 of natural light can be transformed into an output beam 18b, which, depending on the polarization selectivity of the multi-layer coatings 30, 32, 34 and 36 is essentially totally radially (FIG. 2) or tangentially (FIG. 3) polarized. (The arrows for symbolizing the tangential polarization in FIG. 3 are shown curved only for better representing this type of polarization; an exact representation would comprise an infinite number of infinitely short straight, tangentially oriented double arrows).

It has been assumed, in the above discussion that there is no polarizer 21 present and, that the input light beam 18 is comprised of natural (unpolarized) light, from which an output light beam having a polarization state as shown in FIG. 2 or FIG. 3 can be produced. It should be obvious that, alternatively, an input light beam may be used which is totally or partially conventionally polarized by polarizer 21. Interesting polarization states of the output light beam can be produced in this way: When the input light beam 18 is plane polarized in the x direction, an output light beam 18b having the polarization states according to FIG. 4 or 5 is produced, depending on whether the polarization device of FIG. 1 is an r-polarizer (selecting the radial component) or a t-polarizer (selecting the tangential component). In case of r-polarization, the amplitude of the electrical vector E increases in the x direction (which is assumed to be horizontal in FIGS. 4 to 7) from zero on the y axis (which is assumed to extend in the vertical direction in FIGS. 4 to 7) to a maximum value.

When a tangentially polarizing device is used, the polarization pattern of the output light beam shown in FIG. 5 is produced, i.e. the tangential component of the electrical vector E increases in the y direction from the value zero on the x axis to a maximum value at the end of the y axis.

Figure 6B:
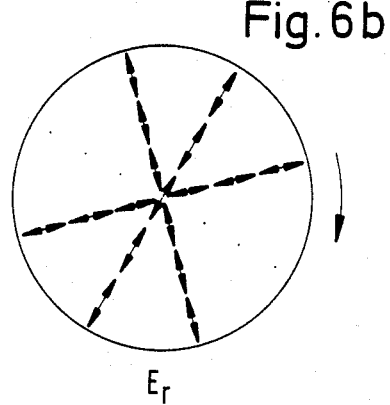
Figure 6C:
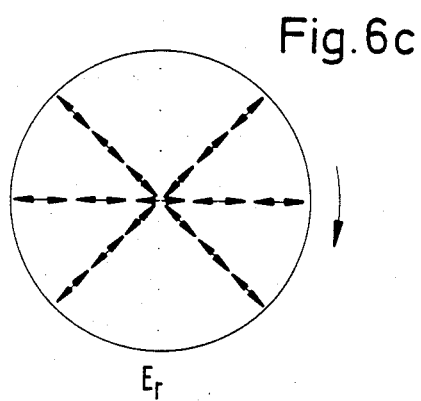

When an input light beam is used which is clockwise (right-hand) circularly polarized, a radially polarizing device according to the invention will produce an output light beam having a polarization as shown in FIGS. 6a to 6c. The amplitude pattern of the electrical vector in a cross-section of the beam corresponds to the pattern of FIG. 4; however, this pattern rotates with the angular frequency of the light in the same sense as the input light beam. FIGS. 6a, 6b and 6c are "snapshots" for the values 0, $\pi/6$ and $\pi/2$, respectively, of the angular frequency. In a predetermined point of time, the angular orientation of the polarization pattern varies by 360 degrees, when proceeding by one wave-length of the light along the z direction.

Figure 7A:
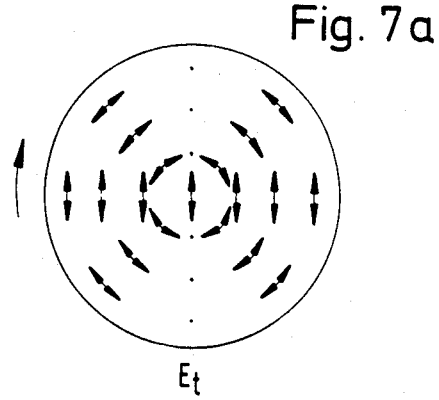
Figure 7B:
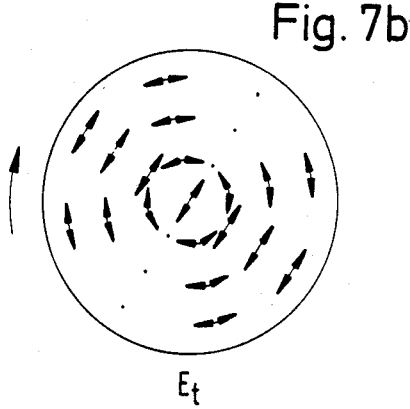
Figure 7C:
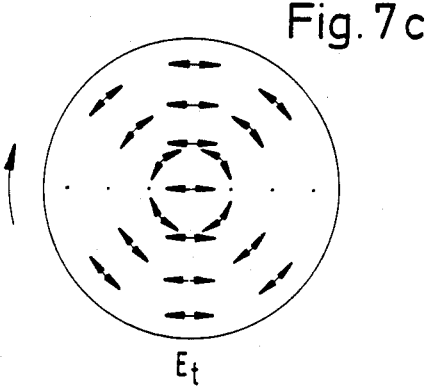

When the clock-wise circularly polarized beam traverse a tangentially polarizing device according to the invention a similar result is obtained, namely a pattern according to FIG. 5 which rotates with the angular frequency of the light wave as shown in FIGS. 7a, 7b, and 7c.

It is to be noted that with a circularly polarized input wave, the absolute value (modulus) of the electrical vector is independent of time in each given point of a plane z=Constant, but rotates with the angular frequency of the light. However, in case of the polarization states shown in FIGS. 6 and 7, a harmonic oscillation (light beam) with constant amplitude and frequency is present in each point of a given cross-section of the output beam, the direction of the electrical vector being either radial or tangential and the phases of the harmonic oscillation differing from one point to an adjacent point so that the mentioned rotation of the electrical vector field pattern results.

The new types of polarization provided by the invention have many new applications. An example will be described with reference to FIG. 8, which is related to Fritz Peter Schafer U.S. patent application Ser. No. 673,615 filed Nov. 20, 1984, incorporated by reference, now U.S. Pat. No. 4,630,274 issued Dec. 2, 1986. The device of FIG. 8 comprises a conical optical member or axicon 40 having a plane light entrance surface and a conical light exit surface 42, which is coaxial to an optical axis 10 and provided with an antireflex coating for t-polarized light. A cylindrical, rod-shaped target 44 of relatively small diameter is positioned on the axis 10 of the axicon 40 adjacent to the apex thereof. An entrance light beam 18b of sufficient intensity to the axicon 40 is produced by projecting a circularly polarized light beam 18 as entrance beam into a polarization device of the type shown in FIG. 1 which is designed for t-polarization. Thus, the exit beam of the device of FIG. 1, which is the entrance beam 18b of the axicon 40 of FIG. 8, is polarized as described with reference to FIGS. 7a to 7c. The target 44 is irradiated by the converging rays which exit from the conical surface 42 of the axicon 40 and provided that the intensity of the beam is sufficient, the target is transformed into a hot plasma. Because of the tangential (azimuthal) orientation of the electrical field lines all ions and electrons are constrained on a circular path that prevents a rapid expansion, and, thus, cooling of the plasma. This may be of paramount importance for pumping of X-ray lasers.

When the above described experiment is performed with radial polarization, the conditions are the very opposite. This allows a very elucidating investigation of the so-called resonant absorption of the plasma. Resonant absorption occurs in a plane target only with p-polarization, which in the case of a cylindrical target corresponds to the r-polarization. The target 44 (FIG. 8) may also be positioned at the exit side of the double cone of FIG. 1.

It was mentioned, with reference to the embodiment of FIG. 1, that the intensity distribution within the double cone 14 is inhomogeneous (inverted), i.e. that very high intensities occur near the axis, if the input beam 18 has a uniform amplitude across its cross-section. This may damage the double cone, if the input beam, e.g. an intense laser beam, exceeds a predetermined intensity value. However, this always can be avoided by employing the polarization device in the beam path after the laser oscillator, which generally has a small output power, and then amplifying the radially or tangentially polarized output beam of the polarization device by one or more laser amplifier stages to produce a polarized beam of the desired intensity. This measure has the additional advantage that a polarization device of relatively small diameter can be used which is less expensive. As an alternative or additionally, a hollow radiation beam may be used in which the paraxial region is void of radiation. The embodiments described above are only exemplary and can be modified in various respects by the skilled artisan without exceeding the scope of the claims. If the intensity distribution in the output beam is of no major concern, the double cone 14 may be omitted. In this case the conical input surface 36 of the exit cone 16 is positioned at the place of the conical entrance surface 32 of the double cone. Under special conditions, a single cone, as the cone 12, may be sufficient, which in this case may perform e.g. the function of the cone 40 in FIG. 8, and may be preferably provided with a polarization-selective coating on its conical surface.

I claim:

1. A device for polarizing an input light beam propagating along a beam path having an optical axis to develop a cylinder-symmetrically polarized output light beam, the device comprising, in the order named along the optical axis from input to output, and coaxial with the optical axis, the following series of light-transmissive bodies and body means, all of material that is transparent to the light of the beam:
   an input body having a planar light entrance surface for receiving the input beam and having a conical light exit surface;
   internal body means for continuing propagation of the light of the beam along the beam path, having a conical light entrance surface facing and receiving light from the input body and having a conical light exit surface;
   and an output body having a conical light entrance surface facing the exit surface of the internal body means and having a planar light exit surface from which a cylinder-symmetrically polarized output light beam emerges.

2. The device as claimed in claim 1 wherein each of the conical surfaces is provided with a polarization selective coating, all of those coatings being selective for the same polarization.

3. The device as claimed in claim 1 wherein each adjacent pair of exit and entrance conical surfaces is spaced so that marginal rays of the beam which emerge from the exit conical surface enter the entrance conical surface without crossing each other in the space between the surfaces.

4. The device as claimed in claim 3 wherein the spacing between such adjacent exit and entrance conical surfaces is such that marginal rays emerging from the exit surface impinge on the apex of the entrance conical surface.

5. The device as claimed in claim 1 and further comprising polarizing means for producing an elliptically (including plane and circularly) polarized input light beam, said means being positioned in the beam path in advance of the planar entrance surface of the input body.

6. The device as claimed in claim 1 wherein the angle between the optical axis and a generatrix of each of the conical surfaces corresponds to the Brewster angle.

7. The device as claimed in claim 1, further comprising means for projecting a hollow input beam onto the light entrance surface of the input body.

8. The device as claimed in claim 2 wherein the angle between the optical axis and a generatrix of each of the conical surfaces corresponds to the Brewster angle.

9. The device as claimed in claim 4 wherein the angle between the optical axis and a generatrix of each of the conical surfaces corresponds to the Brewster angle.

* * * * *